United States Patent
Sprenger et al.

(10) Patent No.: US 9,423,828 B2
(45) Date of Patent: Aug. 23, 2016

(54) SELF-LEVELING SYSTEM WITH AUTO FEEDBACK CONTROL

(71) Applicant: Intel Corporation, Santa Clara, CA (US)

(72) Inventors: Mark Sprenger, Folsom, CA (US); Paul J. Gwin, Orangevale, CA (US)

(73) Assignee: Intel Corporation, Santa Clara, CA (US)

( * ) Notice: Subject to any disclaimer, the term of this patent is extended or adjusted under 35 U.S.C. 154(b) by 221 days.

(21) Appl. No.: 13/931,900

(22) Filed: Jun. 29, 2013

(65) Prior Publication Data

US 2015/0001368 A1    Jan. 1, 2015

(51) Int. Cl.
*F16M 11/24* (2006.01)
*G06F 1/16* (2006.01)

(52) U.S. Cl.
CPC ............. *G06F 1/1633* (2013.01); *G06F 1/166* (2013.01)

(58) Field of Classification Search
CPC ............... G06F 1/1633; G06F 1/166
USPC ............ 248/188.2, 188.3, 188.4, 188.5, 550, 248/677, 688; 361/679.26–679.3, 679.59
See application file for complete search history.

(56) References Cited

U.S. PATENT DOCUMENTS

| | | | | |
|---|---|---|---|---|
| 4,927,119 A * | 5/1990 | Frost | | 248/550 |
| 4,949,923 A * | 8/1990 | Daily | | 248/188.3 |
| D331,304 S * | 11/1992 | Rice | | D34/28 |
| 6,123,312 A * | 9/2000 | Dai | | 248/550 |
| 8,213,177 B2 * | 7/2012 | Uttermann | | H05K 5/0234 248/188.8 |
| 8,763,501 B2 * | 7/2014 | Cheng | | B25B 11/007 248/688 |
| 8,857,265 B2 * | 10/2014 | Silva | | 73/788 |
| 2010/0224745 A1 * | 9/2010 | Orlov et al. | | 248/188.3 |

* cited by examiner

*Primary Examiner* — Gwendolyn W. Baxter
(74) *Attorney, Agent, or Firm* — Patent Capital Group (57) ABSTRACT

A leveling system includes a chassis and a first foot protruding from the chassis. The leveling system also includes a plurality of pressure sensors to measure pressure at a first location at the first foot and a second location separated from the first foot. In addition, the leveling system includes a processor that retracts or extends the first foot using an electroactive polymer (EAP) actuator to balance pressures at the first location and the second location.

17 Claims, 5 Drawing Sheets

SELF-LEVELING SYSTEM WITH AUTO FEEDBACK CONTROL

TECHNICAL FIELD

This disclosure pertains to self-leveling systems in general, and, in a particular application, to a self-leveling system for a computer.

BACKGROUND

Laptop computers are portable devices including many elements of traditional desktop computers in a single casing. The construction of laptop computers varies. For example, one laptop computer includes a display, a standard keyboard, a touchpad, speakers, a hard drive, a battery, and palm rests. Another laptop computer might include a numeric keypad in addition to the standard keyboard. Other laptop computers might supplement the touchpad with hardware buttons, gesture recognition or replace the touchpad with a pointing stick. Some laptop computers replace the display with a touchscreen that combines aspects of a display and a touchpad. Further, some laptop computers include disc drives for discs such as a compact disc (CD), a digital versatile disc (DVD), or a Blu-ray disc (BD).

Laptop computers are available in many different forms. In addition to traditional laptop computers, there are also notebook computers (sometimes referred to simply as "notebooks"), Ultrabooks™, netbooks, and tablet computers. These computing devices are often designed to be used on flat surfaces, such as tables or desks. Accordingly, some of these computers incorporate feet on the bottom of their casings to raise the computers off the flat surfaces, thereby increasing heat dissipation and avoiding minor imperfections in the flat surface.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION

Overview

A leveling system is provided in one example and includes a chassis; a first foot protruding from the chassis; a plurality of pressure sensors to measure (i.e., to evaluate, determine, calculate, quantify, assess, etc.) pressure at a first location at the first foot and a second location separated from the first foot; and logic, at least a portion of which is implemented in hardware, the logic configured to retract or extend the first foot. It is imperative to note that the present disclosure encompasses the general notion of the foot retracting/extending without limiting its teachings to a specific technical means. For example, although the embodiments herein are described with specific reference to an electroactive polymer being the actuating mechanism for retraction and extension of a foot, there are other methodologies that may be utilized in other embodiments, such as solenoids, servo motors, electromagnet/spring combinations, optical frameworks, robotics, etc.

In certain, non-limiting embodiments, the architecture can use an electroactive polymer (EAP) actuator to balance pressures at the first location and the second location. The first foot can include a plurality of stacked EAP actuators. In one embodiment, the EAP actuator turns a screw to balance the pressures.

The leveling system can also include a first shaft including a first axle at one end of the first shaft, and an anchor; a second shaft attached to the first axle at one end of the second shaft, the first foot attached to the other end of the second shaft; and a first EAP actuator that extends from the anchor to the second shaft.

In one embodiment, the anchor includes a ratchet gear that permits the first EAP actuator to retract and prevents the first EAP actuator from extending until a release is activated. In another embodiment, the first foot includes a first wheel, the second shaft includes a third axle, and the first wheel rotates about the third axle.

The leveling system can additionally include a second axle at the other end of the first shaft; a second foot; a third shaft attached to the second axle at one end of the third shaft, the second foot attached to the other end of the third shaft; and a second EAP actuator that extends from the anchor to the third shaft. In one implementation, the second foot includes a second wheel, the third shaft includes a fourth axle, and the second wheel rotates about the fourth axle.

A leveling method is provided in another example and includes measuring, with a plurality of pressure sensors, pressure at a first location at a first foot protruding from a chassis and at a second location separated from the first foot; and retracting or extending the first foot using an electroactive polymer (EAP) actuator to balance pressures at the first location and the second location. The retracting or extending can be performed with a plurality of stacked EAP actuators included in the first foot. The leveling method includes, in a specific implementation, turning a screw with the EAP actuator to balance the pressures.

In one example, the retracting or extending the first foot includes rotating, about a first axle in one end of a first shaft, a second shaft attached to the first axle at one end of the second shaft, the other end of the second shaft attached to the first foot; and retracting or extending a first EAP actuator that extends from an anchor on the first shaft to the second shaft.

In a further example, the method includes permitting the first EAP actuator to retract, and preventing the first EAP actuator from extending until a release of a ratchet gear is activated. In a particular implementation, the rotating includes rotating, about a third axle, a first wheel included in the first foot, and the second shaft includes the third axle.

The method can also include rotating, about a second axle in the other end of the first shaft, a third shaft attached to the second axle at one end of the third shaft, the other end of the third shaft attached to a second foot; and retracting or extending a second EAP actuator that extends from the anchor to the third shaft. In one embodiment, the rotating the third shaft includes rotating, about a fourth axle, a second wheel included in the second foot, and the third shaft rotates about the fourth axle.

A leveling system is provided in an additional example and includes a chassis; a first foot protruding from the chassis; means for measuring pressure at a first location at the first foot and a second location separated from the first foot; and means for retracting or extending the foot to balance pressures at the first location and the second location. The leveling system can also include means for rotating the first foot to balance the pressures. Further, the leveling system can include means for permitting the means for retracting or extending to retract and for preventing the means for retracting or extending from extending until a release is activated. In addition, the leveling system can include a second foot; and means for rotating the second foot to balance the pressures.

Example Embodiments of the Present Disclosure

Figure 1A:
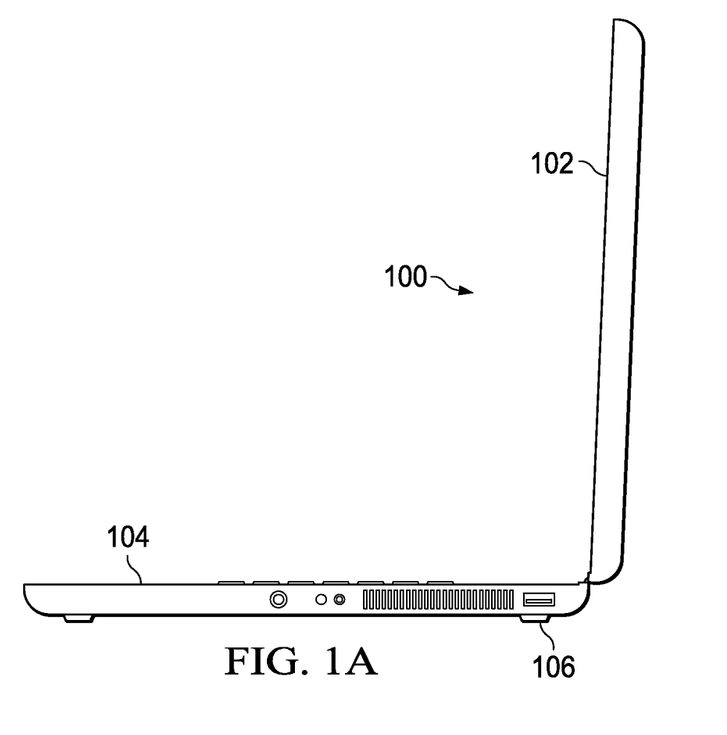
FIGS. 1A-1B are simplified diagrams illustrating a laptop computer implementing a self leveling system in accordance with one embodiment of the present disclosure.

FIG. 1A is a simplified diagram illustrating a laptop computer 100 implementing a self leveling system in accordance with one embodiment of the present disclosure. Commonly, the design of computing devices for use on flat surfaces does not preclude use on non-level surfaces. For example, a seat tray in an airplane generally includes a flat surface with an annular recess to hold a drink. In addition, such a seat tray might include a raised lip along one or several edges. Because there are not alternative surfaces available in the tight quarters of an airline seat, laptop computers are often placed and used on such seat trays.

When laptop computers are placed on non-level surfaces, such as the aforementioned seat tray, the laptop computer might suffer from teetering (e.g., rocking or bouncing) on the non-level surface. This problem can be exacerbated by an external impulse, such as from a user typing on the standard keyboard or numeric keyboard; pressing on the touchpad or its buttons, the pointing stick, or the touchscreen; and opening and closing the display. In addition, the problem can also be exacerbated by internal changes in pressure arising, for example, from movement in the internal disc drives or loud sounds generated by the speakers.

Thus, a laptop computer on a non-level surface might bounce back and forth, as it is touched or the keys are depressed, thereby frustrating the user. Further, some laptop computers teeter even on level surfaces, if the feet of the laptop computer are not perfectly aligned. The current workaround solution for teetering is to reposition the device or to put something underneath to level it. However, repositioning the device is not always possible. In addition, it is not always possible to find suitable materials to put underneath the laptop computer.

As shown in FIG. 1, the laptop computer 100 includes a casing including an upper section 102 and a lower section 104. The upper section 102 includes a display and pivots about the lower section 104. The lower section 104 includes a standard keyboard and a touchpad on an upper face of that section. The lower section 104 also includes a processor that controls the overall operations of the laptop computer 100. In addition, the lower section 104 also includes a disk drive, such as a hard disk drive or an optical disc drive. Such a disk drive includes a read head. Either, neither, or both sections can include speakers.

The aforementioned description is presented by way of example only and is not intended to be limiting. For example, the display can be replaced with a touchscreen. The standard keyboard can include (or be supplemented with) a numeric keypad. The touchpad can be supplemented or replaced with a pointing stick. The touchpad can also be supplemented with hardware buttons. A hard disk drive might not include a read head.

Note that in other embodiments, the sections, components, etc. be of any suitable size, shape, dimensions, placements, etc. It is imperative to note that all of the specifications, dimensions, and relationships outlined herein (e.g., height, width, length, materials, etc.) have only been offered for purposes of example and teaching only. Each of these data may be varied considerably without departing from the spirit of the present disclosure, or the scope of the appended claims. The specifications apply only to one non-limiting example and, accordingly, they should be construed as such. In the foregoing description, example embodiments have been described. Various modifications and changes may be made to such embodiments without departing from the scope of the appended claims. The description and drawings are, accordingly, to be regarded in an illustrative rather than a restrictive sense.

Further, any element in the upper section 102 can be alternatively or additionally included in the lower section 104 or can be excluded entirely. Similarly, any element in the lower section 104 can be alternatively or additionally included in the upper section 102 or can be excluded entirely. In one embodiment, the processor also executes the self leveling operations of the present disclosure. In other embodiments, a separate processor executes the self leveling operations.

Figure 1B:
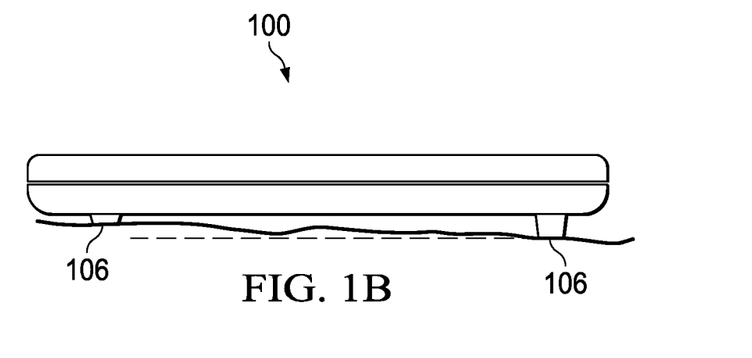

As shown in FIG. 1B, the lower section 104 also includes at least one foot 106 on the lower face of that section. In addition, the lower face of the lower section 104 includes a plurality of pressure sensors. The processor controls an electroactive polymer (EAP) actuator located in a foot 106, based on a distribution of pressure sensed by the pressure sensors. The EAP actuator extends or retracts the foot, thereby leveling the laptop computer, as illustrated in FIG. 1B.

In one embodiment, the pressure sensors measure pressure by reading a current for a predetermined period of time. The processor in the lower section or a processor in the sensor determines an amount of charge and a voltage, based on the current and predetermined period of time. Based on this amount of charge and voltage, a capacitance and a change in capacitance arising from a compression of plates of a dielectric polymer (capacitor) are estimated. In other embodiments, the pressure sensors measure pressure in a different manner. In a specific implementation, the pressure sensors are in the EAP actuators.

Types of EAPs include dielectric EAPs and ionic EAPs. A dielectric EAP includes a polymer placed between two electrodes. When a voltage is applied to one of the electrodes, the dielectric EAP compresses in the direction of the electric field between the electrodes and expands in directions perpendicular to the electric field. Examples of such a polymer are polyvinylidene fluoride and isoprene natural rubber latex. Other dielectric EAPs, such as silicones and acrylics, can be used.

In an ionic EAP, ions are randomly distributed at rest. Further, ions cluster around one of the electrodes upon activation of the EAP, causing the EAP to become rigid and thereby physically extend. As one example, 1-butyl-2,3- dimethylimidazolium chloride is suitable for use as an ionic EAP. Of course, other ionic EAPs can also be used.

In either case, the capacitance in the EAP changes with the deformation (e.g., the amount of extension/retraction) thereof. When a sensor detects an increased capacitance and sharp changes therein, a processor decreases or shuts off a voltage to that EAP until another sensor equalizes its capacitance. The system is level when the capacitances are balanced according to a pre-known calibration. In one embodiment, the pre-known calibration is an equality of the capacitances.

Figure 2:
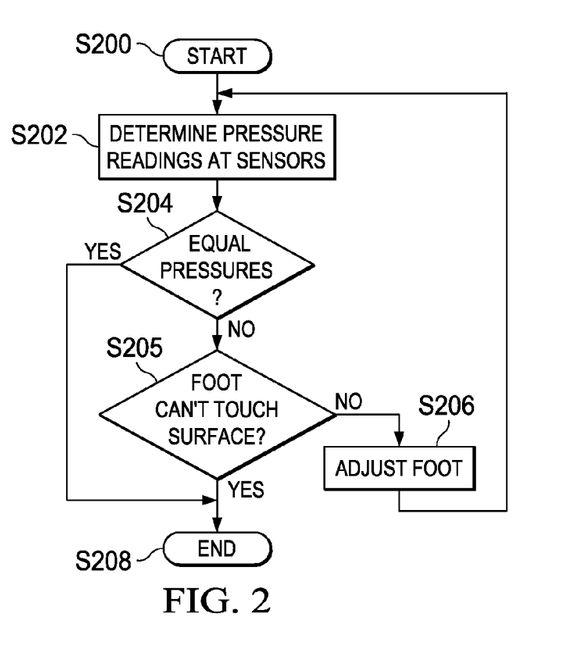
FIG. 2 is a simplified algorithm illustrating operations of a self-leveling system in accordance with one embodiment of the present disclosure.

FIG. 2 illustrates a simplified algorithm for the self leveling system in accordance with one embodiment. The operations of FIG. 2 begin at S200 and proceed to S202. At S202, the system determines the pressure readings at the sensors on the lower face of the lower section 104 of the laptop computer. At S204, the system determines whether the pressure readings are equal. If the pressure readings are equal at S204, the operations end at S208.

If the pressure readings are not equal at S204, the operations optionally proceed to S205. In S205, it is determined whether one of the feet cannot touch a surface on which the laptop computer is otherwise resting. In one example, the determination at S205 determines how many times the pressures have been determined to be unequal in S204. If this number of times exceeds a predetermined threshold (e.g., two), then the operations proceed to end in S208. Of course, this predetermined threshold can vary based on the granularity of the foot adjustment in S206. For example, if the adjustment in S206 is large, the predetermined threshold can decrease. If the adjustment in S206 is small, the predetermined threshold can increase. Alternatively, this determination at S205 can be based on a predetermined duration (e.g., 5 seconds), rather than a number of times of a determination in S204. Further, an additional sensor can, e.g., visually inspect whether the distance to the ground exceeds the extension distance of the EAP actuator. That is, each foot will have known extents to its motion, so if a foot were to reach out to the limit of its motion and not sense a touch (e.g., by a change in pressure or capacitance), then the operations would end at S208. This inspection can also be done, e.g., through radar, sonar, or microwaves. In this way, the system can give up if one foot has no footing on a surface.

At S206, the processor adjusts a foot 106 at one of the pressure sensors to equalize the pressure readings. The processor first determines whether to retract or extend the foot 106. In one implementation, the processor extends the foot 106 if the sensor at that foot 106 senses less pressure than is sensed by the other sensor. In such an implementation, the processor retracts the foot 106 if the sensor at that foot senses more pressure than is sensed by the other sensor. The processor then controls an actuator located at that foot 106, such as by adjusting the voltage applied to an EAP at that foot 106. The operations then return to the pressure determination at S202.

In embodiments with multiple feet, the processor can perform a complementary action (e.g., retraction) at an EAP actuator at one of the feet rather than perform a nominal action (e.g., extension) at an EAP actuator at another foot. For example, one foot might be fully extended. Thus, if a pressure sensor senses less pressure at another foot, the processor can retract the extended foot rather than extend the other foot. In one embodiment with multiple feet, the processor simultaneously adjusts the feet. For example, rather than only extending a single foot, the processor extends that foot and simultaneously retracts another foot. Such an embodiment reduces the overall time to level the laptop computer.

Figure 3:
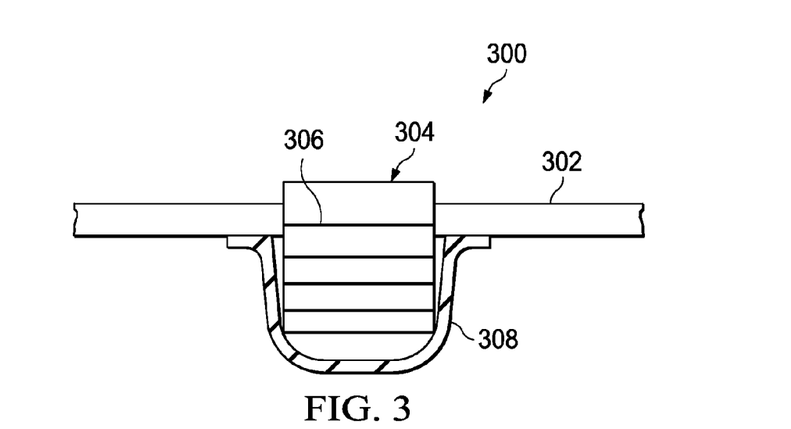
FIG. 3 is a simplified diagram illustrating a foot in a self leveling system in accordance with one embodiment of the present disclosure.

FIG. 3 is a simplified diagram illustrating a foot 300 in a self-leveling system in accordance with one embodiment. As shown in FIG. 3, the foot 300 includes an outer coating 308 and an EAP roll or stack 304. The outer coating 308 is approximately cylindrical in shape. Other shapes are possible, such as a box, a sphere, or a cone. In addition, in one embodiment, the outer coating is made of rubber. Other materials, typically chosen for having a large stretch ratio and a high resilience, can be used also or instead. In addition, the cover may be a construction that provides a minimum back driving force, such as a bellows shape, to allow extension and retraction without adding additional force to the EAP actuator. The EAP roll or stack 304 includes multiple EAP actuators 306 vertically stacked upon each other. Each of these EAP actuators has its own charge plates. This stacking of the EAP actuators permits increased movement in the vertical direction, relative to having only one EAP actuator.

Figure 4:
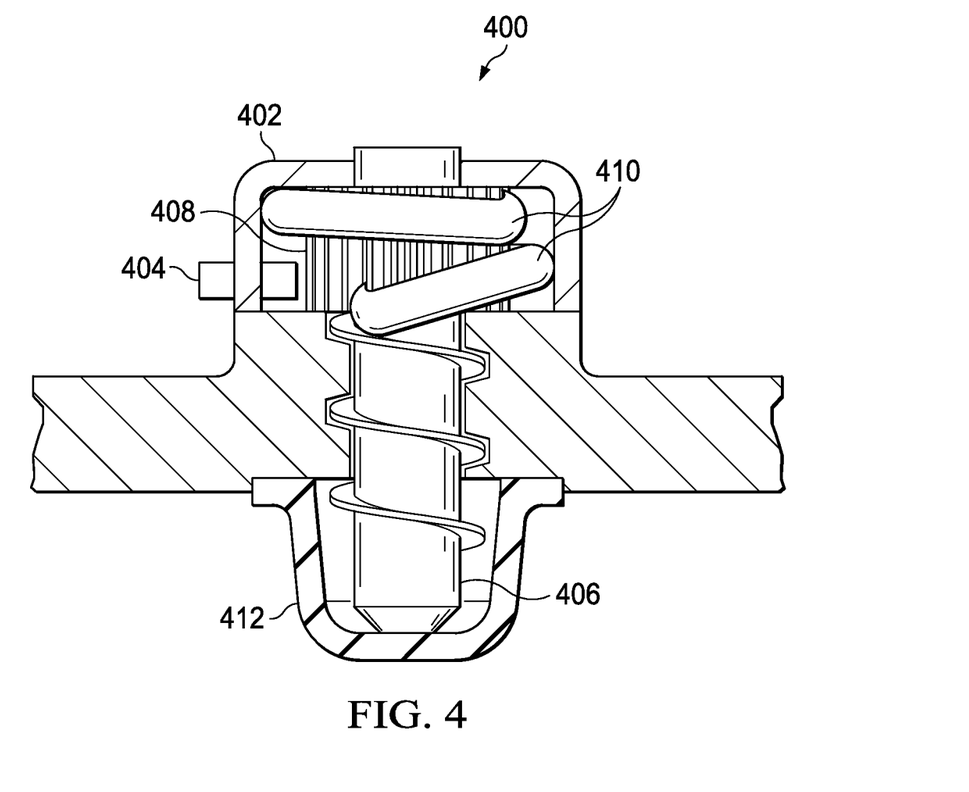
FIG. 4 is a simplified diagram illustrating a side view of a screw foot in a self leveling system in accordance with one embodiment of the present disclosure.

FIG. 4 is a simplified diagram illustrating a side view of a screw foot 400 in a self-leveling system in accordance with one embodiment. The screw foot 400 includes a non-backdrive screw 406, an outer coating 412, a connector 404, a drive gear 408, and a plurality of EAP actuators 410. The non-backdrive screw 406 projects through the lower surface of the lower section 104 of the laptop computer. In the illustrated embodiment, the head of the screw is in an interior portion of the lower section 104. Of course, in some embodiments, the head of the screw might extend beyond the upper surface of the lower section 104 and into the lower section 104. Because the screw 406 is a non-backdrive screw, the pressure of the laptop computer does not cause the screw 406 to backdrive.

The outer coating 412 covers a portion of the screw 406 projecting outside of the lower surface of the lower section 104 of the laptop computer. The outer coating 412 can be made of rubber. Other materials, typically chosen for having a large stretch ratio and a high resilience, can be used also or instead.

The connector 404 attaches the screw foot to an internal portion of the lower surface of the lower section 104 of the laptop computer. The connector 404 covers the screw 406 to prevent dust from accumulating on the threads of the screw 406. In the embodiment illustrated in FIG. 4, the connector 404 projects into the inside of the lower section 104. In an embodiment in which the non-backdrive screw 406 does not project internally into the lower section 104, the connector 404 can be flush with an upper portion of the lower surface of the lower section 104.

The plurality of EAP actuators 410 attach to the drive gear 408 and produce torque on the drive gear 408 by retracting and extending, as explained below. The drive gear 408 transmits this torque to the non-backdrive screw 406 to turn the screw 406. The screw 406 is driven downward to extend the foot 400 or upward to retract the foot 400.

The screw 406 is efficiently driven by aligning the torque applied by the plurality of EAP actuators 410. For example, if plural EAP actuators are actuated at a same (or similar) time, their individual activation should reflect their positioning and the activation of another of the plural EAP actuators. For example, if the EAP actuators are positioned near each other, along the circumference of the drive gear, and they are to be activated at a similar timing, then they should both extend in the same direction (e.g., clockwise) and retract in the opposite direction (e.g., counterclockwise). If they are to be activated in a complementary manner, one should extend in one direction (e.g., clockwise) while the other retracts in the opposite direction (e.g., counterclockwise).

Alternatively, if the plural EAP actuators oppose each other, e.g., across the drive gear, and they are to be activated at a similar timing, one EAP actuator should extend in one direction (e.g., clockwise), while the other EAP actuator extends in the opposite direction (e.g., counterclockwise). If they are to be activated in a complementary manner, one EAP actuator should extend in one direction (e.g., clockwise), while the other EAP actuator retracts in the same direction (e.g., clockwise).

Further, some ionic EAPs require energy to maintain a state of extension or retraction. As such, in one embodiment of a screw foot including these ionic EAPs, the EAP actuators are positioned in a complementary manner to minimize the number of EAP actuators activated at one time. Thus, one EAP actuator should extend in one direction (e.g., clockwise) while the other retracts in the opposite direction (e.g., counterclockwise).

Figure 5:
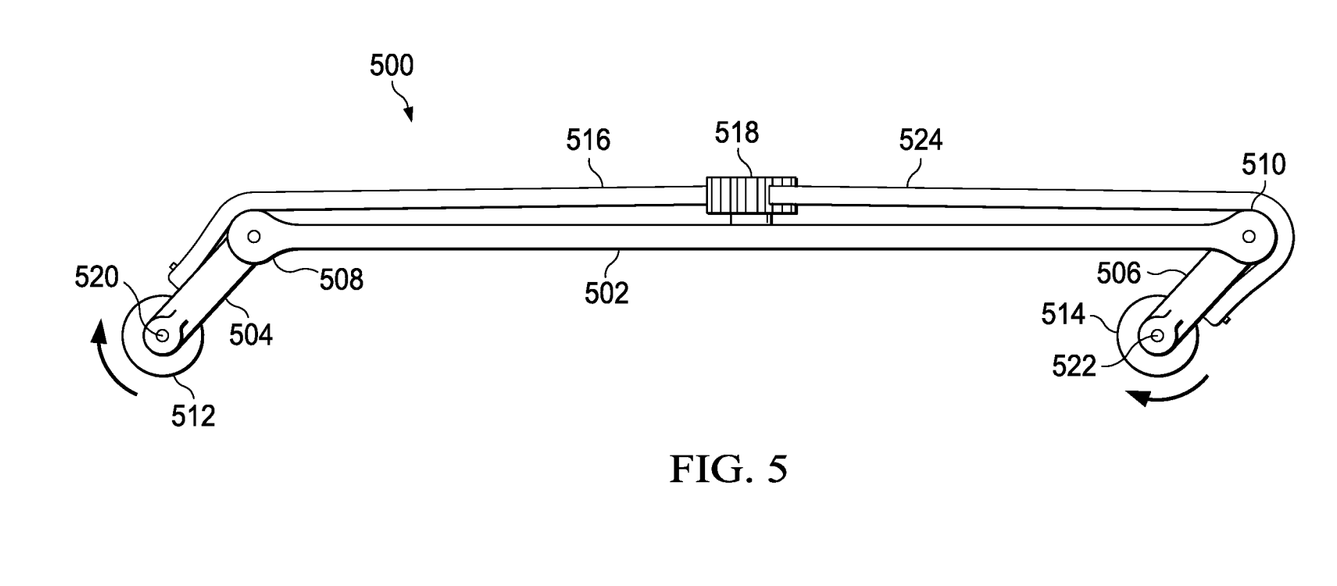
FIG. 5 is a simplified diagram illustrating a side view of a coupling system in a self leveling system in accordance with one embodiment of the present disclosure.

FIG. 5 is a simplified diagram illustrating a side view of a coupling system 500 in a self-leveling system in accordance with one embodiment. The coupling system includes a first foot 512, a second foot 514, a first shaft 502, a second shaft 504, a third shaft 506, two EAP actuators 516, 524, and an anchor 518. The first shaft 502 extends along the width of the lower surface of the lower section 104 of the laptop computer. At each end of the first shaft 502 is an axle. The second shaft 504 is coupled to an axle 508 at one end of the second shaft 504. The second shaft 504 is located toward the front of the laptop computer in one embodiment. The third shaft 506 is coupled to an axle 510 at one end of the third shaft 506. Each of the second shaft 504 and the third shaft 506 have a foot located at the other end of the respective shaft, where the first foot 512 is attached to the second shaft 504, and the second foot 514 is attached to the third shaft 506.

In one embodiment, the feet are implemented using wheels. In such an embodiment, the other end of the second shaft 504 includes an axle 520. The other end of the third shaft 506 includes an axle 522 in this embodiment. The wheels attach to these axles of the second and third shaft and rotate about their respective axles.

Of course, other embodiments of the feet are possible, such as flat feet that slide along surfaces. Such flat feet can be used with or instead of the wheels. A first EAP actuator 516 extends from the second shaft 504 to an anchor 518 on the first shaft 502. A second EAP actuator 524 extends from the third shaft 506 to the anchor 518. In one embodiment, the first and second EAP actuators 516, 524 are controlled independently.

In one embodiment, only one EAP actuator 516, 524 is activated at a time. For example, if the laptop computer is to be tilted forward, then the first EAP actuator 516 is extended, while the second EAP actuator 524 stays in its previous state. Because the second shaft 504 is angled at an angle greater than 90° from the first shaft 502, this extension decreases the vertical contribution of the length of the second shaft 504. Accordingly, the coupling system 500 tilts the laptop computer forward.

Alternatively, the second EAP actuator 524 can be retracted, while the first EAP actuator 516 stays in its previous state. In this case, because the third shaft 506 is angled at an angle less than 90° from the first shaft 502, this extension increases the vertical contribution of the length of the third shaft 506.

Similarly, if the laptop computer is to be tilted backward, then the first EAP actuator 516 can be retracted, while the second EAP actuator 524 stays in its previous state. Alternatively, the second EAP actuator 524 can be extended, while the first EAP actuator stays in its previous state.

In another embodiment, both EAP actuators are activated. In an exemplary embodiment, both EAP actuators are activated simultaneously. For example, the laptop computer can be tilted forward by both extending the first EAP actuator 516 and retracting the second EAP actuator 524. Such dual actuation can cause the laptop computer to tilt farther forward than an embodiment in which the first EAP actuator 516 extends and the second EAP actuator 524 rests. In addition, the actuation of both EAP actuators can improve the response time in reaching the same angle of tilt relative to an embodiment in which the first EAP actuator extends and the second actuator EAP stays in its previous state.

In addition, the activation of both EAP actuators allows the laptop computer to rise or to be lowered. Typically, in this embodiment, coupling systems on opposing sides of the laptop computer (e.g., left and right) activate both EAP actuators of each coupling system simultaneously. This embodiment helps level the laptop computer, e.g., when the left side of the laptop computer is lower than the right side of the laptop computer. To lower the laptop computer, the first EAP actuator 516 extends when the second EAP actuator 524 extends. To raise the laptop computer, the first EAP actuator 516 retracts when the second EAP actuator 524 retracts.

Further, in some implementations, the anchor 518 includes a ratchet gear for each of the EAP actuators 516, 524. The ratchet gear permits its associated EAP actuator 516, 524 to retract and prevents the EAP actuator 516, 524 from extending until a release is activated.

Figure 6:
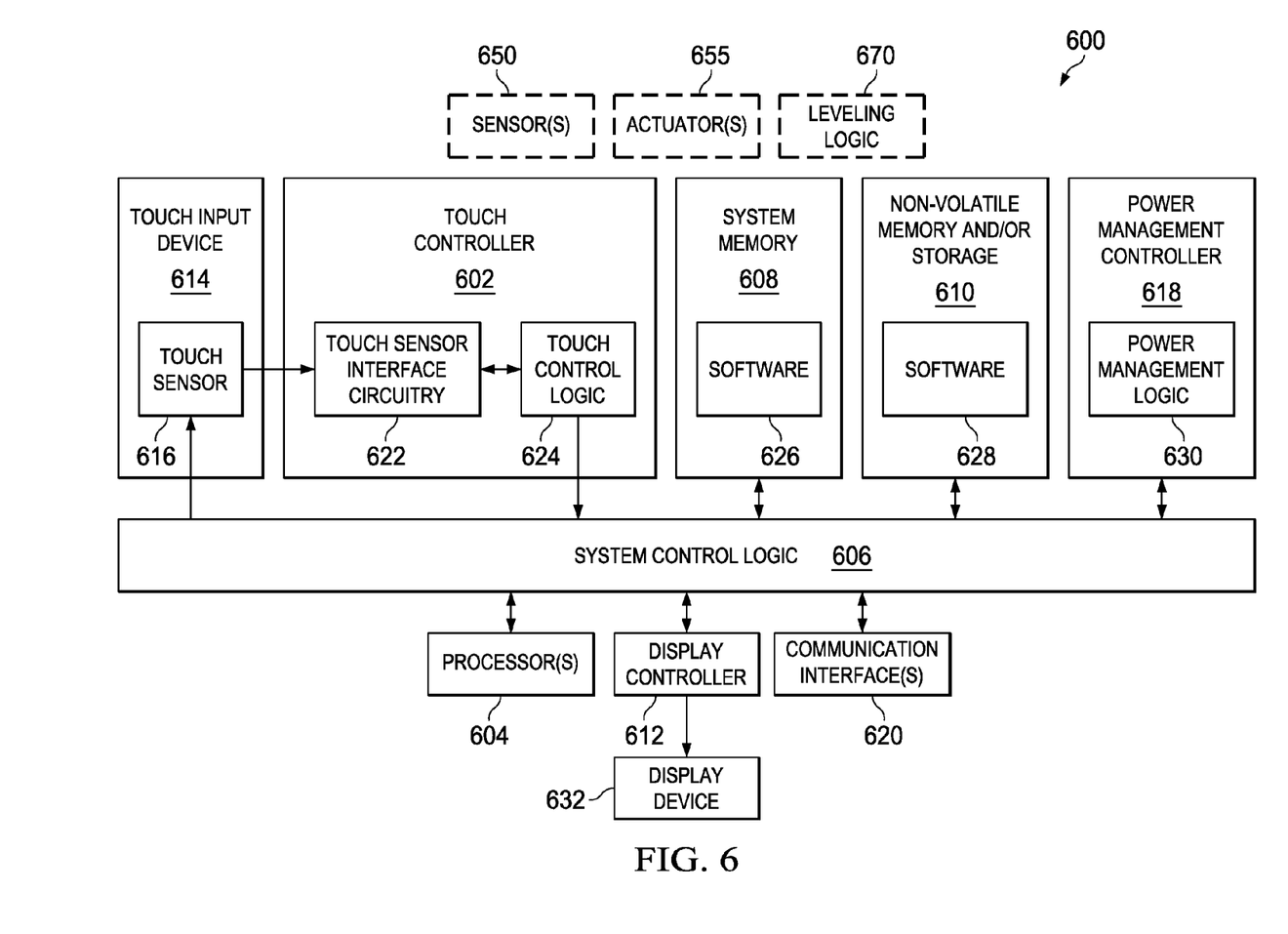
FIG. 6 is a simplified block diagram illustrating potential electronics associated with an embodiment of the present disclosure.

In summary, once the system has been leveled, it will resist teetering and tipping when a user types or touches the screen on a clamshell system, such as a laptop computer. Having a system self level can increase the user experience. FIG. 6 is a simplified block diagram illustrating potential electronics associated with laptop computer 100. More particularly, FIG. 6 illustrates an embodiment of an example system 600 that can be included in any portion (or shared by portions) of laptop computer 100. FIG. 6 may include one or more sensors 650, one or more actuators 655, and leveling logic 670, which may be provisioned in any suitable location with respect to the laptop computer (e.g., any appropriate internal location, any external location, any combination of these, etc.). These three items may cooperate, coordinate, or otherwise share responsibilities in order to achieve the teachings of the present disclosure.

System 600 includes a touch input device 614, a touch controller 602, one or more processors 604, system control logic 606 coupled to at least one of processor(s) 604, system memory 608 coupled to system control logic 606, non-volatile memory and/or storage device(s) 610 coupled to system control logic 606, display controller 612 coupled to system control logic 606, display controller 612 coupled to a display, power management controller 618 coupled to system control logic 606, and communication interface(s) 620 coupled to system control logic 606.

Touch input device 614 includes touch sensor 616, and each can be implemented using any suitable touch-sensitive technology such as, for example and without limitation, capacitive, resistive, surface acoustic wave (SAW), infrared, and optical imaging. Touch input device 614, in a particular embodiment, is implemented using any suitable multi-touch technology.

System control logic 606, in a particular embodiment, includes any suitable interface controllers to provide for any suitable interface to at least one processor 604 and/or to any suitable device or component in communication with system control logic 606. System control logic 606, in a particular embodiment, includes one or more memory controllers to provide an interface to system memory 608. System memory 608 can be used to load and store data and/or instructions, such as software 626, for example, for system 600. System memory 608, in a particular embodiment, includes any suitable volatile memory, such as suitable dynamic random access memory (DRAM) or SDRAM, for example. System control logic 606, in a particular embodiment, includes one or more input/output (I/O) controllers to provide an interface to a display device, touch controller 602, and non-volatile memory and/or storage device(s) 610.

Non-volatile memory and/or storage device(s) 610 can be used to store data and/or instructions, for example, within software 628. Non-volatile memory and/or storage device(s) 610 can include any suitable non-volatile memory, such as flash memory, for example, and/or any suitable non-volatile storage device(s), such as one or more hard disc drives (HDDs), one or more compact disc (CD) drives, and/or one or more digital versatile disc (DVD) drives, for example.

Power management controller 618 includes power management logic 630 configured to control various power management and/or power saving functions of laptop computer 100 based upon whether laptop computer 100 is in an open configuration or a closed configuration and/or a physical orientation of laptop computer 100. In one embodiment, power management controller 618 is configured to reduce the power consumption of components or devices of system 600 that can either be operated at reduced power or turned off when laptop computer 100 is in the closed configuration. For example, in a particular embodiment when laptop computer 100 is in a closed configuration, power management controller 618 performs one or more of the following: power down the unused portion of the display and/or any backlight associated therewith; allow one or more of processor(s) 604 to go to a lower power state if less computing power is required in the closed configuration; and shutdown any devices and/or components, such as a keyboard or EAP actuators, that are unused when laptop computer 100 is in the closed configuration.

Communications interface(s) 620 can provide an interface for system 600 to communicate over one or more networks and/or with any other suitable device. Communications interface(s) 620 can include any suitable hardware and/or firmware. Communications interface(s) 620, in a particular embodiment, includes, for example, a network adapter, a wireless network adapter, a telephone modem, and/or a wireless modem.

System control logic 606, in a particular embodiment, includes one or more input/output (I/O) controllers to provide an interface to any suitable input/output device(s) such as, for example, an audio device to help convert sound into corresponding digital signals and/or to help convert digital signals into corresponding sound, a camera, a camcorder, a printer, and/or a scanner.

For one embodiment, at least one processor 604 can be packaged together with logic for one or more controllers of system control logic 606. In one embodiment, at least one processor 604 is packaged together with logic for one or more controllers of system control logic 606 to form a System in Package (SiP). In one embodiment, at least one processor 604 is integrated on the same die with logic for one or more controllers of system control logic 606. For a particular embodiment, at least one processor 604 is integrated on the same die with logic for one or more controllers of system control logic 606 to form a System on Chip (SoC).

For touch control, touch controller 602 can include touch sensor interface circuitry 622 and touch control logic 624. Touch sensor interface circuitry 622 can be coupled to detect touch input over a first touch surface layer and a second touch surface layer of a display (e.g., display device 632). Touch sensor interface circuitry 622 can include any suitable circuitry that can depend, for example, at least in part, on the touch-sensitive technology used for touch input device 614. Touch sensor interface circuitry 622, in one embodiment, can support any suitable multi-touch technology. Touch sensor interface circuitry 622, in one embodiment, includes any suitable circuitry to convert analog signals corresponding to a first touch surface layer and a second surface layer into any suitable digital touch input data. Suitable digital touch input data for one embodiment includes, for example, touch location or coordinate data.

Touch control logic 624 can be coupled to help control touch sensor interface circuitry 622 in any suitable manner to detect touch input over a first touch surface layer and a second touch surface layer. Touch control logic 624 for one embodiment can also be coupled to output in any suitable manner digital touch input data corresponding to touch input detected by touch sensor interface circuitry 622. Touch control logic 624 can be implemented using any suitable logic, including any suitable hardware, firmware, and/or software logic (e.g., non-transitory tangible media), that can depend, for example, at least in part on the circuitry used for touch sensor interface circuitry 622. Touch control logic 624 for one embodiment supports any suitable multi-touch technology.

Touch control logic 624 can be coupled to output digital touch input data to system control logic 606 and/or at least one processor 604 for processing. At least one processor 604 for one embodiment can execute any suitable software to process digital touch input data output from touch control logic 624. Suitable software can include, for example, any suitable driver software and/or any suitable application software. As illustrated in FIG. 6, system memory 608 can store suitable software 626 and/or non-volatile memory and/or storage device(s).

Non-Exhaustive, Potential Modifications and Alternatives

In at least one embodiment, a device is provided that includes leveling logic, at least a portion of which is partially implemented in hardware, the logic configured to: receive a plurality of pressure measurements from a plurality of pressure sensors, the plurality of pressure measurements including a measurement at a first location at a first foot protruding from a chassis and a measurement at a second location separated from the first foot; and retract or extend the first foot using an actuator mechanism to balance pressures at the first location and the second location. For example, one implementation involves the logic itself (for example, where that logic is in an embedded controller). The embedded controller may be provided as a part, potentially separate from the hardware sensors/actuators. In certain cases, this logic could be implemented in software (which may mean that the processor is being instructed to utilize the sensor measurements and command the actuators). Further, the architecture could be implemented in embedded firmware that a separate control device utilizes, or it could be implemented as its own standalone hardware chip controller.

In one modification of the algorithm of FIG. 2, voltages are applied to the EAP in S206 until a sharp change is seen in S202. This change signals that the foot has reached the surface. Once this change is change is seen in S202, the process ends at S208.

The algorithm of FIG. 2 can also include extending both feet to support the chassis in a level attitude, in situations where the mass is teetering between the feet or the chassis is centered high off the surface on which the feet of the chassis are to rest. The algorithm of FIG. 2 can also be enhanced through modifications that can be implemented, depending on the hardware included in the laptop computer. Such hardware includes a keyboard and/or numeric keypad, a touchpad, a disk drive, speakers, a touchscreen, a pointing stick, and hardware buttons. These hardware devices reflect an increased likelihood of changes in pressure distribution in the laptop computer. Of course, any hardware device that is known to change the pressure distribution of a computer during use can be used as a basis for modifying the FIG. 2 algorithm. In the case of input devices, such as a keyboard, numeric keypad, touchpad, pointing stick, hardware buttons, and touchscreen, the processor can determine an average input pressure or average input duration over a predetermined duration, such as a period of time (e.g., one minute) or a number of inputs (e.g., the last 10 inputs using a specific input device). The processor can then ignore any changes in pressure that increase the pressure less than this average input pressure. The processor can also or alternatively ignore any changes in pressure that have a shorter duration than the average input duration.

Further, the processor can characterize the pressures based on the location of the input devices. For example, some manufacturers displace the keyboard to a rear portion of the lower section closest to the upper section. Accordingly, the processor can ignore the increased pressures sensed by the rear sensors in view of the average input duration or pressure associated with the keyboard. Similarly, the processor can ignore the increased pressures sensed by the rightmost sensors in view of the average input duration or pressure associated with the numeric keypad. The processor can ignore increased pressures sensed at a front portion of the lower section farthest from the upper section, in view of the average input duration or pressure associated with the touchpad, pointing stick, or hardware buttons. In addition, a touchscreen, when present, is typically located on the upper section of the laptop computer. Accordingly, the pressure received at the touchscreen is transferred to the rear of the lower section 104 closest to the upper section. In this case, the processor can ignore increases in pressure at the rearmost sensors, in view of the average input duration or pressure associated with the touchscreen. The processor can also ignore pressure changes received when an input is expected, e.g., when a GUI button requests an input.

A disk drive differs from the devices discussed previously in that the laptop computer has greater control over the timing and duration of access to the disk drive. Accordingly, the processor can monitor the access to the disk drive and ignore changes in pressure arising during disk drive access.

Further, the processor can monitor the magnitude of the pressure created by speakers, similar to the above discussion pertaining to the disk drive. That is, the processor controls sound playback and can therefore ignore changes in pressure arising from, for example, bass or drum components. Thus, the processor can process a sound to detect a feature, e.g., a number of beats per minute of a song. The processor can then predict future pressure changes arising from that sound aspect and ignore pressure changes occurring therefrom.

Unlike disk drive access, the pressure exerted by the speakers is based on a user controlled variable, namely volume. Thus, the processor can also or alternatively measure the magnitude of an output sound. The processor can ignore pressure changes occurring when the magnitude of the output sound exceeds a predetermined threshold. Thus, the processor can ignore pressure changes arising from loud sounds, including sudden sounds that cannot be predicted from a tempo of a song. Similarly, the processor can ignore pressure changes occurring when the magnitude of the output sounds is below a predetermined threshold, thereby ignoring pressure changes arising merely from sound output, rather than an uneven surface. Of course, the processor can implement both types of thresholding. In addition, the thresholding can be combined with the prediction of future pressure changes to ignore sounds of a particular magnitude occurring at a particular time. Thus, the system can retain sensitivity to external pressure changes of a magnitude similar to an output sound.

The screw foot shown in FIG. 4 was implemented with two EAP actuators. However, in one embodiment, an actuator produces enough torque both when it expands and retracts to extend/retract the screw relative to the lower surface of the lower section 104 of the laptop computer. In such a case, the screw foot can be implemented with a single EAP actuator.

In other embodiments, data from additional sensors form a basis for controlling the self leveling system. For example, in one implementation, the upper section of the laptop computer includes an accelerometer. This additional sensor senses changes in the direction and velocity of the upper section 102. The sensor transmits the information to the processor, which then corrects the extension of a foot or feet, based on the changed direction and velocity. For example, if the processor determines the upper section 102 is accelerating backward, e.g., such as during opening of a clamshell, the processor transmits a signal to the foot to extend to resist the increased force. Alternatively, the processor will ignore the change in pressure. Thus, the processor activates the EAP actuator, in view of the transient nature of opening the laptop computer. The EAP motion can be designed such that it dampens the rocking motion.

As discussed above, more than one foot can be provided. Indeed, in one embodiment, four feet are provided, with one foot located in the general area of each of the corners of the lower face of the lower section 102.

In another embodiment, the determination at S202 is not limited to whether the pressure readings are equal. For example, the processor can determine whether the pressure readings at the sensors are within predetermined tolerances, such as 10% or 5%.

Further, the present disclosure was written with a view toward leveling a laptop computer. However, the teachings are also applicable to tilting a laptop, such as to improve the ergonomics of using a keyboard, touchpad, pointing stick, or palm rest. For example, in an embodiment with four feet, the front two feet (i.e., the two furthest from the upper section 102) might retract to be lower than the rear two feet. In this case, the laptop computer would be gently inclined forward. In such a scenario, the front feet equally balance a different mass than is balanced by the rear feet. Although this disclosure described such tilting in view of the embodiment shown in FIG. 5, these teachings are equally applicable to the subject matter of FIGS. 3-4.

The self-leveling can be actively initiated via software or a hardware button. In one such embodiment, the operations of FIG. 2 are performed when an instruction is given by software. Such an instruction can be given by selecting a graphical user interface (GUI) button with a touchpad, a pointing stick, a touchscreen, or a keyboard. The software can also generate the leveling instruction to provide user interaction, such as in a video game. Further, when a physical reaction to a software algorithm is called for (e.g., to provide haptic feedback to the user), the software can provide intelligent feedback.

In another embodiment, the operations of FIG. 2 are performed when a hardware button is pressed. The button can be located on the upper face of the lower section 104 for proximity to the keyboard, touchpad, or pointing stick. Such proximity enables convenient access during use of such input devices. Of course, the hardware button can also be located at another position, such as a side surface of the lower section 104.

The present disclosure identified the use of dielectric EAPs and ionic EAPs. However, the teachings of this disclosure are not limited to such EAPs. Indeed, the use of a later-developed EAP is specifically contemplated and is considered within the scope of the present teachings.

This disclosure identified the use of a laptop computer. In some embodiments, the laptop computer is a convertible laptop computer in which the upper section 102 rotates or slides to be above the lower section 104. In another embodiment, the lower section 104 detaches from the upper section 102. The teachings of this disclosure can be implemented with other devices, particularly lightweight, portable devices, such as an electronic book.

Numerous other changes, substitutions, variations, alterations, and modifications may be ascertained to one skilled in the art, and it is intended the present disclosure encompasses all such changes, substitutions, variations, alterations, and modifications as falling within the scope of the appended claims. To assist the United States Patent and Trademark Office (USPTO) and, additionally, any readers of any patent issued on this application in interpreting the claims appended hereto, Applicant wishes to note that the Applicant: (a) does not intend any of the appended claims to invoke 35 U.S.C. section 112(f) as it exists on the date of the filing hereof unless the words "means for" or "step for" are specifically used in the particular claims; and (b) does not intend, by any statement in the specification, to limit this disclosure in any way that is not otherwise reflected in the appended claims.

Example Embodiment Implementations

One particular example implementation includes a leveling system, comprising a chassis; a first foot protruding from the chassis; means for measuring pressure at a first location at the first foot and a second location separated from the first foot; and means for retracting or extending the foot to balance pressures at the first location and the second location. In more specific embodiments, the leveling system can further comprise means for rotating the first foot to balance the pressures. The leveling system can further comprise means for permitting the means for retracting or extending to retract. The leveling system can also include a second foot; and means for rotating the second foot to balance the pressures.

Other Notes and Examples

Example A1 is a leveling system that may include a chassis; a first foot protruding from the chassis; a plurality of pressure sensors to measure pressure at a first location at the first foot and a second location separated from the first foot; and logic, at least a portion of which is partially implemented in hardware, the logic configured to retract or extend the first foot.

In Example A2, the subject matter of Example A1 may optionally have the logic configured to retract or extend the first foot includes using an electroactive polymer (EAP) actuator to balance pressures at the first location and the second location. In Example A3, the subject matter of any of the preceding 'A' Examples can optionally include the EAP actuator turning a screw to balance the pressures, and where the first foot includes a plurality of stacked EAP actuators.

In Example A4, the subject matter of any of the preceding 'A' Examples can optionally include a first shaft including a first axle at one end of the first shaft, and an anchor; a second shaft attached to the first axle at one end of the second shaft, the first foot attached to the other end of the second shaft; and a first EAP actuator that extends from the anchor to the second shaft. In Example A5, the subject matter of any of the preceding 'A' Examples can optionally have the anchor including a ratchet gear that permits the first EAP actuator to retract and prevents the first EAP actuator from extending until a release is activated.

In Example A6, the subject matter of any of the preceding 'A' Examples can optionally include the first foot having a first wheel, the second shaft includes a third axle, and the first wheel rotates about the third axle. In Example A7, the subject matter of any of the preceding 'A' Examples can optionally include a second axle at the other end of the first shaft; a second foot; a third shaft attached to the second axle at one end of the third shaft, the second foot attached to the other end of the third shaft; and a second EAP actuator that extends from the anchor to the third shaft. In Example A8, the subject matter of any of the preceding 'A' Examples can optionally include the second foot having a second wheel, the third shaft includes a fourth axle, and the second wheel rotates about the fourth axle.

Example M1 is a method that can include measuring, with a plurality of pressure sensors, pressure at a first location at a first foot protruding from a chassis and at a second location separated from the first foot; and retracting or extending the first foot. In Example M2, the subject matter of Example M1 can optionally have the retracting to include using an electroactive polymer (EAP) actuator to balance pressures at the first location and the second location, and where the retracting or extending is performed with a plurality of stacked EAP actuators included in the first foot. In Example M3, the subject matter of any of the prevision 'M' Examples can optionally include turning a screw with the EAP actuator to balance the pressures.

In Example M4, the subject matter of any of the prevision 'M' Examples can optionally include rotating, about a first axle in one end of a first shaft, a second shaft attached to the first axle at one end of the second shaft, the other end of the second shaft attached to the first foot; and retracting or extending a first EAP actuator that extends from an anchor on the first shaft to the second shaft. In Example M5, the subject matter of any of the prevision 'M' Examples can optionally include permitting the first EAP actuator to retract, and preventing the first EAP actuator from extending until a release of a ratchet gear is activated. In Example M6, the subject matter of any of the prevision 'M' Examples can optionally include rotating, about a third axle, a first wheel included in the first foot, and the second shaft includes the third axle. In Example M7, the subject matter of any of the prevision 'M' Examples can optionally include rotating, about a second axle in the other end of the first shaft, a third shaft attached to the second axle at one end of the third shaft, the other end of the third shaft attached to a second foot; and retracting or extending a second EAP actuator that extends from the anchor to the third shaft.

Example E1 is a leveling system that may include a chassis; a first foot protruding from the chassis; means for measuring pressure at a first location at the first foot and a second location separated from the first foot; and means for retracting or extending the foot to balance pressures at the first location and the second location.

In Example E2, the subject matter of Example E1 can optionally include means for rotating the first foot to balance the pressures. In Example E3, the subject matter of Example E1 and/or E2 can optionally include means for permitting the means for retracting or extending to retract, or to prevent extending until a release is activated. In Example E4, the subject matter of Example E1, E2, and/or E3 can optionally include a second foot; and means for rotating the second foot to balance the pressures.

Example C1 is at least one machine readable storage medium having instructions stored thereon corresponding to leveling logic, at least a portion of which is partially implemented in hardware, the logic configured to: receive a plurality of pressure measurements from a plurality of pressure sensors, the plurality of pressure measurements including a measurement at a first location at a first foot protruding from a chassis and a measurement at a second location separated from the first foot; and retract or extend the first foot using an actuator mechanism to balance pressures at the first location and the second location.

Example X1 is a machine-readable storage medium including machine-readable instructions, when executed, to implement a method or realize an apparatus as in any one of the Examples A1-A7 and M1-M7. Example Y1 is an apparatus comprising means for performing of any of the Example methods M1-M7. In Example Y2, the subject matter of Example Y1 can optionally include the means for performing the method comprising a processor and a memory. In Example Y3, the subject matter of Example Y2 can optionally include the memory comprising machine-readable instructions, that when executed cause the apparatus to perform any of the Example methods M1-M7.

What is claimed is:

1. A leveling system, comprising:
   a chassis;
   a first foot protruding from the chassis;
   a plurality of pressure sensors to measure pressure at a first location at the first foot and a second location separated from the first foot; and
   logic, at least a portion of which is partially implemented in hardware, the logic configured to retract or extend the first foot using an electroactive polymer actuator to balance pressures at the first location and the second location.

2. The leveling system of claim 1, wherein the electroactive polymer actuator turns a screw to balance the pressures, and the first foot includes a plurality of stacked electroactive polymer actuators.

3. The leveling system of claim 1, further comprising:
   a first shaft including a first axle at one end of the first shaft, and an anchor;
   a second shaft attached to the first axle at one end of the second shaft, the first foot attached to the other end of the second shaft; and
   a first electroactive polymer actuator that extends from the anchor to the second shaft.

4. The leveling system of claim 3, wherein the anchor includes a ratchet gear that permits the first electroactive polymer actuator to retract and prevents the first electroactive polymer actuator from extending until a release is activated.

5. The leveling system of claim 3, wherein the first foot includes a first wheel, the second shaft includes a third axle, and the first wheel rotates about the third axle.

6. The leveling system of claim 3, further comprising:
   a second axle at the other end of the first shaft;
   a second foot;
   a third shaft attached to the second axle at one end of the third shaft, the second foot attached to the other end of the third shaft; and
   a second electroactive polymer actuator that extends from the anchor to the third shaft.

7. The leveling system of claim 6, wherein the second foot includes a second wheel, the third shaft includes a fourth axle, and the second wheel rotates about the fourth axle.

8. A leveling method, comprising:
   measuring, with a plurality of pressure sensors, pressure at a first location at a first foot protruding from a chassis and at a second location separated from the first foot; and
   retracting or extending the first foot using an electroactive polymer actuator to balance pressures at the first location and the second location.

9. The leveling method of claim 8, wherein the retracting or extending is performed with a plurality of stacked electroactive polymer actuators included in the first foot.

10. The leveling method of claim 9, further comprising:
    turning a screw with the electroactive polymer actuator to balance the pressures.

11. The leveling method of claim 8, wherein the retracting or extending the first foot further comprises:
    rotating, about a first axle in one end of a first shaft, a second shaft attached to the first axle at one end of the second shaft, the other end of the second shaft attached to the first foot; and
    retracting or extending a first electroactive polymer actuator that extends from an anchor on the first shaft to the second shaft.

12. The leveling method of claim 11, further comprising:
    permitting the first electroactive polymer actuator to retract, and preventing the first electroactive polymer actuator from extending until a release of a ratchet gear is activated.

13. The leveling method of claim 11, wherein the rotating includes rotating, about a third axle, a first wheel included in the first foot, and the second shaft includes the third axle.

14. The leveling method of claim 11, further comprising:
    rotating, about a second axle in the other end of the first shaft, a third shaft attached to the second axle at one end of the third shaft, the other end of the third shaft attached to a second foot; and
    retracting or extending a second electroactive polymer actuator that extends from the anchor to the third shaft.

15. The leveling method of claim 14, wherein the rotating the third shaft includes rotating, about a fourth axle, a second wheel included in the second foot, and the third shaft rotates about the fourth axle.

16. A device, comprising:
    leveling logic, at least a portion of which is partially implemented in hardware, the logic configured to
    receive a plurality of pressure measurements from a plurality of pressure sensors, the plurality of pressure measurements including a measurement at a first location at a first foot protruding from a chassis and a measurement at a second location separated from the first foot; and retract or extend the first foot using an electroactive polymer actuator mechanism to balance pressures at the first location and the second location.

17. The device of claim 16, further comprising:

a first shaft including a first axle at one end of the first shaft, and an anchor;

a second shaft attached to the first axle at one end of the second shaft, the first foot attached to the other end of the second shaft; and a first electroactive polymer actuator that extends from the anchor to the second shaft.

* * * * *